US009764818B2

(12) United States Patent
Nampy et al.

(10) Patent No.: US 9,764,818 B2
(45) Date of Patent: Sep. 19, 2017

(54) STRUCTURAL, CELLULAR CORE WITH CORRUGATED SUPPORT WALLS

(71) Applicant: Rohr, Inc., Chula Vista, CA (US)

(72) Inventors: Sreenivas Narayanan Nampy, San Diego, CA (US); David M. Adams, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 15/040,663

(22) Filed: Feb. 10, 2016

(65) Prior Publication Data
US 2017/0225764 A1    Aug. 10, 2017

(51) Int. Cl.
| B64C 1/40 | (2006.01) |
| G10K 11/168 | (2006.01) |
| B64D 29/00 | (2006.01) |
| G10K 11/172 | (2006.01) |
| B64C 1/00 | (2006.01) |
| G10K 11/16 | (2006.01) |

(52) U.S. Cl.
CPC ............. B64C 1/40 (2013.01); B64D 29/00 (2013.01); G10K 11/168 (2013.01); G10K 11/172 (2013.01)

(58) Field of Classification Search
CPC ....... G10K 11/168; G10K 11/172; F02C 7/24; F02C 7/045; B64C 1/40; B64D 29/00
USPC ................. 181/292, 288, 214, 213
See application file for complete search history.

(56) References Cited

U.S. PATENT DOCUMENTS

| 2,333,343 | A | * | 11/1943 | Sendzimir | ............... B21D 53/00 |
| | | | | | 156/197 |
| 2,848,132 | A | * | 8/1958 | Davous | .................... B31D 3/04 |
| | | | | | 156/197 |
| 3,341,395 | A | * | 9/1967 | Weber | ................... E04C 2/3405 |
| | | | | | 428/134 |
| 3,507,355 | A | * | 4/1970 | Lawson | .................... E04B 1/86 |
| | | | | | 181/292 |
| 3,542,152 | A | | 11/1970 | Adamson | |
| 3,639,106 | A | | 2/1972 | Yate | |
| 3,734,234 | A | | 5/1973 | Wirt | |
| 3,821,999 | A | | 7/1974 | Guess et al. | |
| 3,848,697 | A | * | 11/1974 | Jannot | ..................... F02K 1/827 |
| | | | | | 181/220 |
| 3,850,261 | A | | 11/1974 | Hehmann et al. | |
| 3,910,374 | A | | 10/1975 | Holehouse | |
| 3,948,346 | A | | 4/1976 | Schindler | |
| 4,189,027 | A | | 2/1980 | Dean, III et al. | |

(Continued)

FOREIGN PATENT DOCUMENTS

| CN | 104723616 | 6/2015 |
| FR | 2201010 | 4/1974 |

(Continued)

Primary Examiner — Edgardo San Martin
(74) Attorney, Agent, or Firm — O'Shea Getz P.C.

(57) ABSTRACT

A structural panel may be configured for attenuating noise. This panel includes a first skin, a second skin and a core forming a plurality of cavities vertically between the first skin and the second skin. The core may include a wall connected to and extending vertically between the first skin and the second skin. The wall may be laterally between and fluidly separate at least a first of the cavities from a second of the cavities. The wall may include a vertical stiffener. One or more perforations in the first skin may be fluidly coupled with the first of the cavities.

20 Claims, 11 Drawing Sheets

(56) References Cited

U.S. PATENT DOCUMENTS

| | | |
|---|---|---|
| 4,240,519 A | 12/1980 | Wynosky |
| 4,541,879 A | 9/1985 | Riel |
| 4,743,740 A | 5/1988 | Adee |
| 4,859,517 A * | 8/1989 | Hull .................. B32B 3/12 156/292 |
| 5,431,980 A * | 7/1995 | McCarthy ............ B31D 3/023 428/116 |
| 5,923,003 A | 7/1999 | Arcas et al. |
| 5,927,647 A | 7/1999 | Masters et al. |
| 5,997,985 A | 12/1999 | Clarke et al. |
| 6,871,725 B2 | 3/2005 | Johnson |
| 7,124,856 B2 | 10/2006 | Kempton et al. |
| 7,588,212 B2 | 9/2009 | Moe et al. |
| 7,784,283 B2 | 8/2010 | Yu et al. |
| 7,814,658 B2 | 10/2010 | Akishev et al. |
| 7,954,224 B2 | 6/2011 | Douglas |
| 7,959,109 B2 | 6/2011 | Dasilva et al. |
| 7,963,362 B2 | 6/2011 | Lidoine |
| 7,971,684 B2 | 7/2011 | Gantie et al. |
| 8,025,122 B2 | 9/2011 | Gilcreest et al. |
| 8,245,815 B2 | 8/2012 | Valleroy et al. |
| 8,336,316 B2 | 12/2012 | Kirby |
| 8,413,922 B2 | 4/2013 | Porte et al. |
| 8,544,598 B2 | 10/2013 | Gaudry et al. |
| 8,646,574 B2 | 2/2014 | Drevon et al. |
| 8,684,301 B2 | 4/2014 | Porte et al. |
| 8,733,501 B2 | 5/2014 | Porte et al. |
| 8,763,751 B2 | 7/2014 | Starobinski et al. |
| 8,776,946 B2 | 7/2014 | Todorovic |
| 8,820,477 B1 | 9/2014 | Herrera et al. |
| 8,955,643 B2 | 2/2015 | Liu |
| 2011/0100747 A1 | 5/2011 | Hoetzeldt et al. |
| 2013/0266772 A1 | 10/2013 | Fujii |
| 2014/0349082 A1 | 11/2014 | Tien |
| 2015/0284945 A1 | 10/2015 | Tien |
| 2015/0292413 A1 | 10/2015 | Soria et al. |

FOREIGN PATENT DOCUMENTS

| | | |
|---|---|---|
| GB | 1406844 | 9/1975 |
| RU | 2413654 | 6/2010 |

* cited by examiner

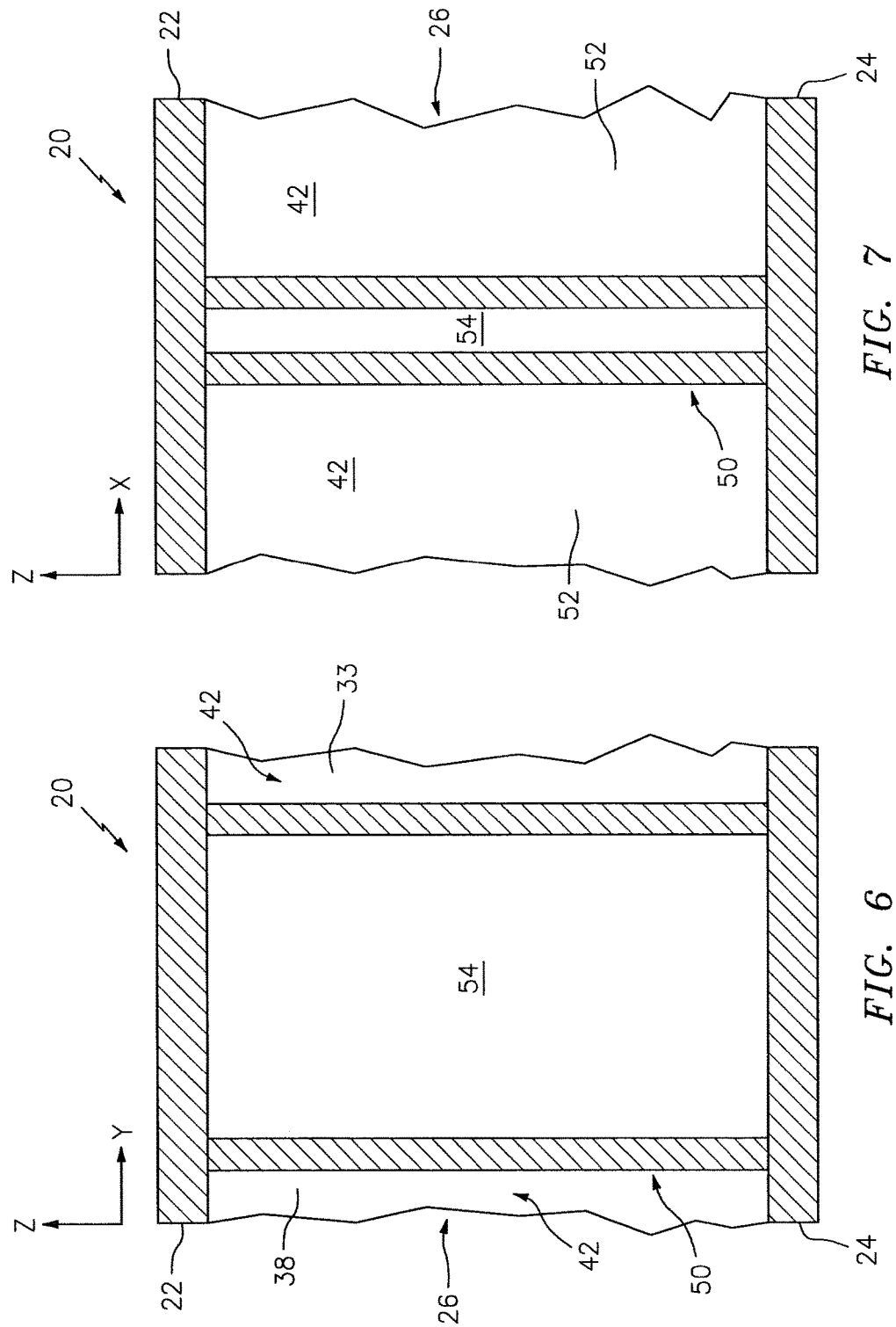

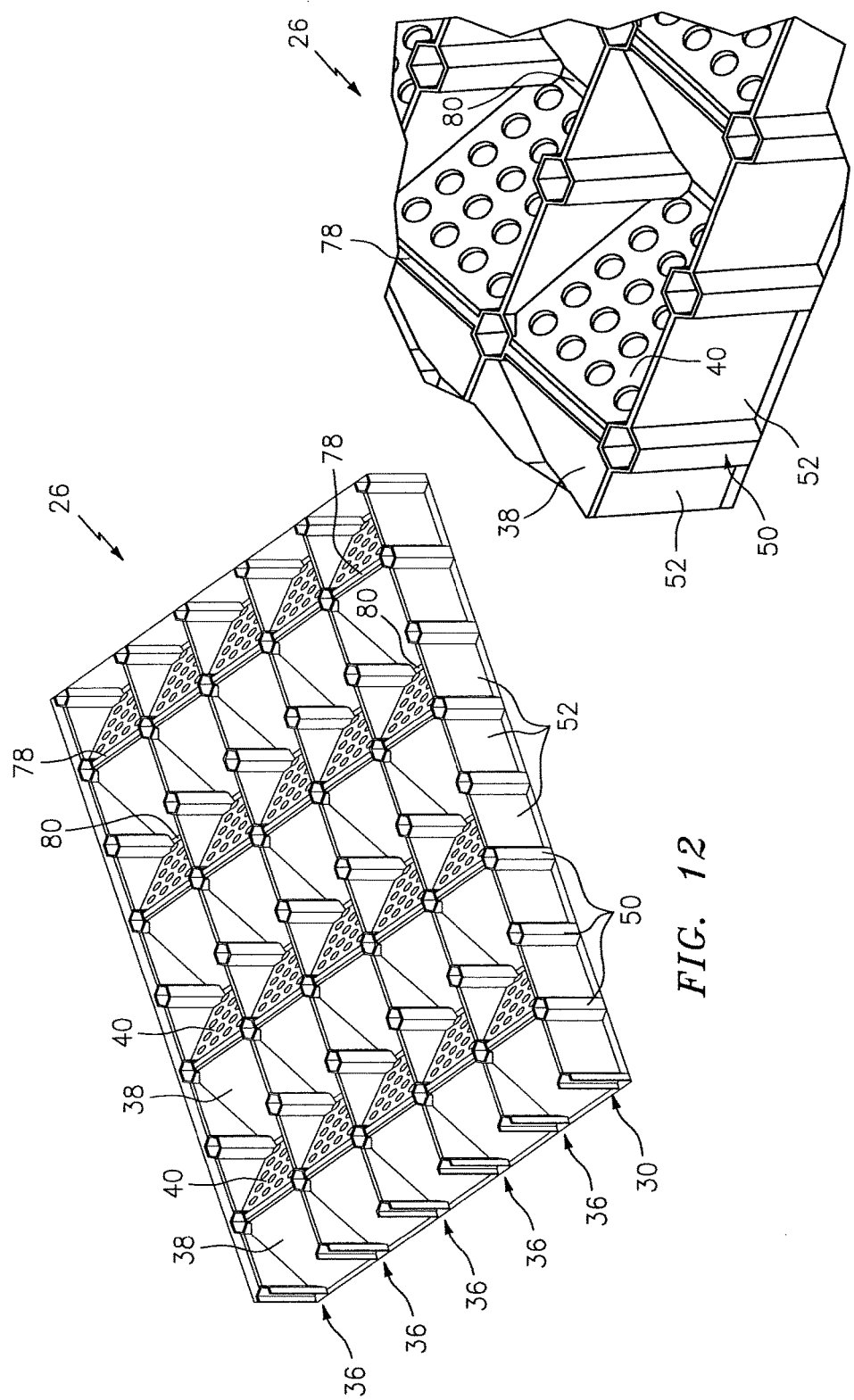

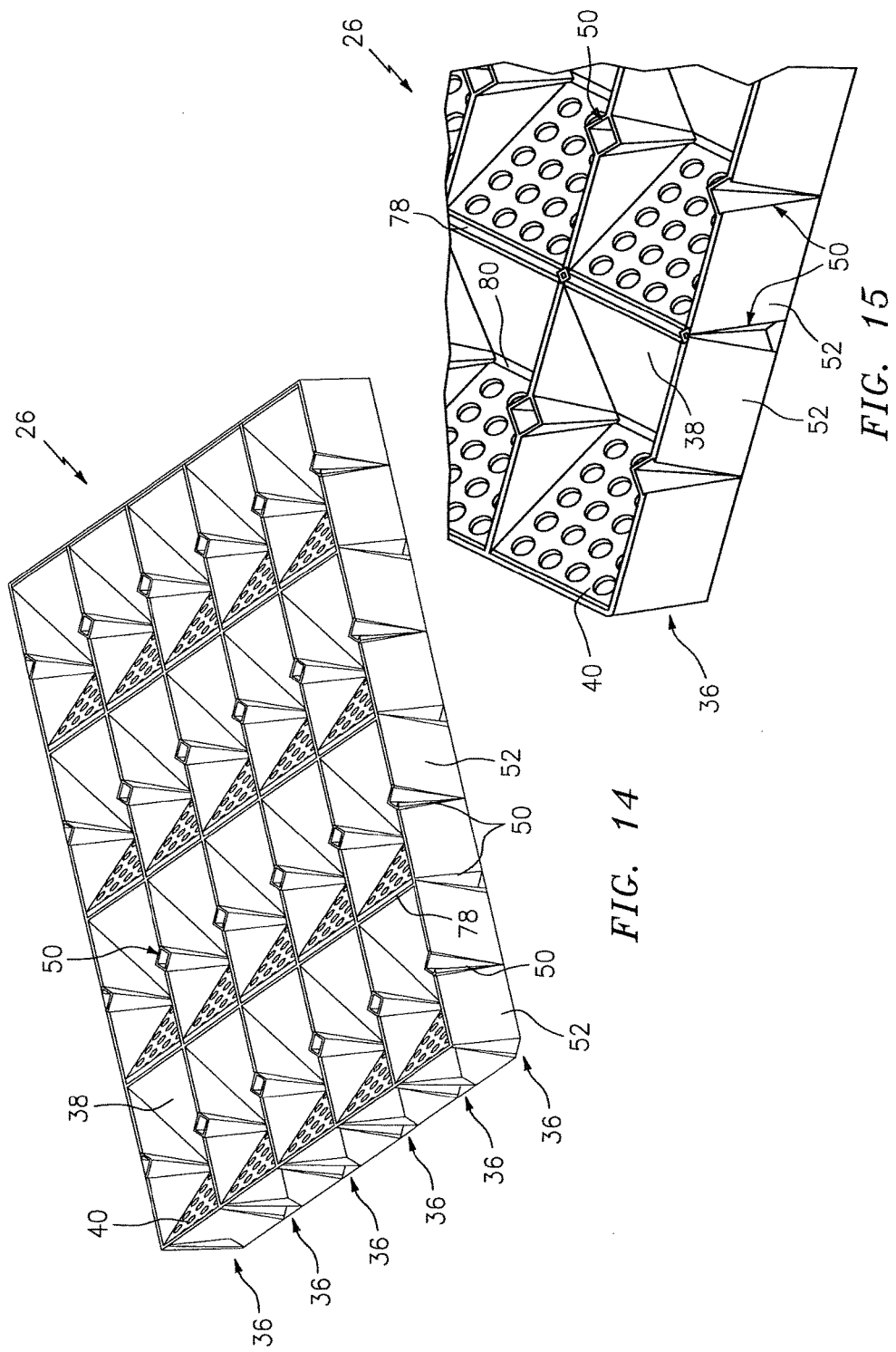

STRUCTURAL, CELLULAR CORE WITH CORRUGATED SUPPORT WALLS

BACKGROUND OF THE INVENTION

1. Technical Field

This disclosure relates generally to noise attenuation and, more particularly, to an acoustic panel for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for relatively low frequency noise. There is a need in the art therefore for an acoustic panel operable to attenuate relatively low frequency noise while utilizing the same or less space than previous acoustic panels. There is a further need to provide such a panel with the same or more structural integrity than previous acoustic panels. There is still a further need for such a panel to be formable (e.g., drapable, bendable, etc.) during manufacturing process without degrading structural or acoustic performance.

SUMMARY OF THE DISCLOSURE

According to an aspect of the present disclosure, a structural panel is provided, which may be configured for attenuating noise. This panel includes a first skin, a second skin and a core. The core forms a plurality of cavities vertically between the first skin and the second skin. The core includes a wall connected to and extending vertically between the first skin and the second skin. The wall is laterally between and fluidly separates at least a first of the cavities from a second of the cavities. The wall includes a vertical stiffener. One or more perforations in the first skin are fluidly coupled with the first of the cavities.

According to another aspect of the present disclosure, another structural panel is provided for attenuating noise. This panel includes a first skin, a second skin and a core. The core forms a plurality of cavities vertically between the first skin and the second skin. The core includes a plurality of walls connected to and extending vertically between the first skin and the second skin. A first of the walls is laterally between and fluidly separates at least a first of the cavities from a second of the cavities. A second of the walls is laterally between and fluidly separates at least the first of the cavities from a third of the cavities. Each of the walls includes a vertical stiffener. The vertical stiffener of the first of the walls projects partially laterally into the first of the cavities. One or more perforations in the first skin are fluidly coupled with the first of the cavities.

According to still another aspect of the present disclosure, another structural panel is provided for attenuating noise. This panel includes a first skin, a second skin and a core. The core forms a plurality of cavities vertically between the first skin and the second skin. The core includes a plurality of walls, an array of baffles and an array of septums. A first of the walls is laterally between and fluidly separates at least a first of the cavities from a second of the cavities. A second of the walls is laterally between and fluidly separates at least the first of the cavities from a third of the cavities. The baffles are interdisposed with the septums in a corrugated configuration. The first of the cavities extends between an adjacent pair of the baffles. A first of the septums is disposed between the adjacent pair of the baffles and divides the first of the cavities into fluidly coupled first and second sub-cavities. The first of the walls includes a plurality of vertical stiffeners distributed along a longitudinal length of the first of the walls. One or more perforations in the first skin are fluidly coupled with the first of the cavities.

The vertical stiffener may be one of a plurality of vertical stiffeners included with the wall. One of the vertical stiffeners may be disposed a longitudinal distance along the wall from an adjacent one of the vertical stiffeners.

The vertical stiffener may project laterally partially into the first of the cavities. The vertical stiffener may also or alternatively project laterally partially into the second of the cavities.

The vertical stiffener may be hollow and include a bore extending at least vertically within the vertical stiffener. One or more perforations in the first skin may be fluidly coupled with the bore.

The vertical stiffener may extend vertically to the first skin. The vertical stiffener may also or alternatively extend vertically to the second skin.

The vertical stiffener may be connected to the first skin. The vertical stiffener may also or alternatively be connected to the second skin.

The vertical stiffener may be configured to enable vertical bending of the wall.

The vertical stiffener may be configured as an accordion bellow.

The wall may be a first wall and the vertical stiffener may be a first vertical stiffener. The core may include a second wall connected to and extending vertically between the first skin and the second skin. The second wall may be laterally between and fluidly separate at least the first of the cavities from a third of the cavities. The second wall may include a second vertical stiffener.

The core may include a plurality of baffles and a plurality of septums. The baffles may be arranged in a longitudinal linear array. Each of the baffles may be connected to and extend laterally between the first wall and the second wall. The first of the cavities may extend longitudinally between an adjacent pair of the baffles. The septums may be arranged in a longitudinal linear array. Each of the septums may be connected to and extend laterally between the first wall and the second wall. A first of the septums may be disposed between the adjacent pair of the baffles and divide the first of the cavities into fluidly coupled first and second sub-cavities.

The first of the septums may be connected to and extend between the adjacent pair of the baffles.

The baffles may be arranged with the septums together in a corrugated configuration.

The vertical stiffener may be at an intersection between the first of the septums and one of the adjacent pair of the baffles.

The vertical stiffener may be a first vertical stiffener and the wall may also include a second vertical stiffener. The first vertical stiffener may be at an intersection between the first of the septums and a first of the adjacent pair of the baffles. The second vertical stiffener may be at an intersection between the first of the septums and a second of the adjacent pair of the baffles.

The vertical stiffener may be one of a plurality of vertical stiffeners included with the wall. Each of the vertical stiffeners may be configured as a structural flange portion. The wall may also include a plurality of webs, where each of the webs extends longitudinally between an adjacent pair of the vertical stiffeners.

The panel may be configured as a component of an aircraft propulsion system.

The foregoing features and the operation of the invention will become more apparent in light of the following description and the accompanying drawings.

BRIEF DESCRIPTION OF THE DRAWINGS

FIG. 6 is a sectional illustration of a vertical stiffener included in the acoustic panel of FIGS. 2 and 3 taken in the y-z plane.

FIG. 7 is another sectional illustration of the vertical stiffener taken in the x-z plane.

FIGS. 12 and 13 are partial, perspective illustrations of another cellular core for the acoustic panel.

FIGS. 14 and 15 are partial, perspective illustrations of another cellular core for the acoustic panel.

DETAILED DESCRIPTION OF THE INVENTION

Figure 1:
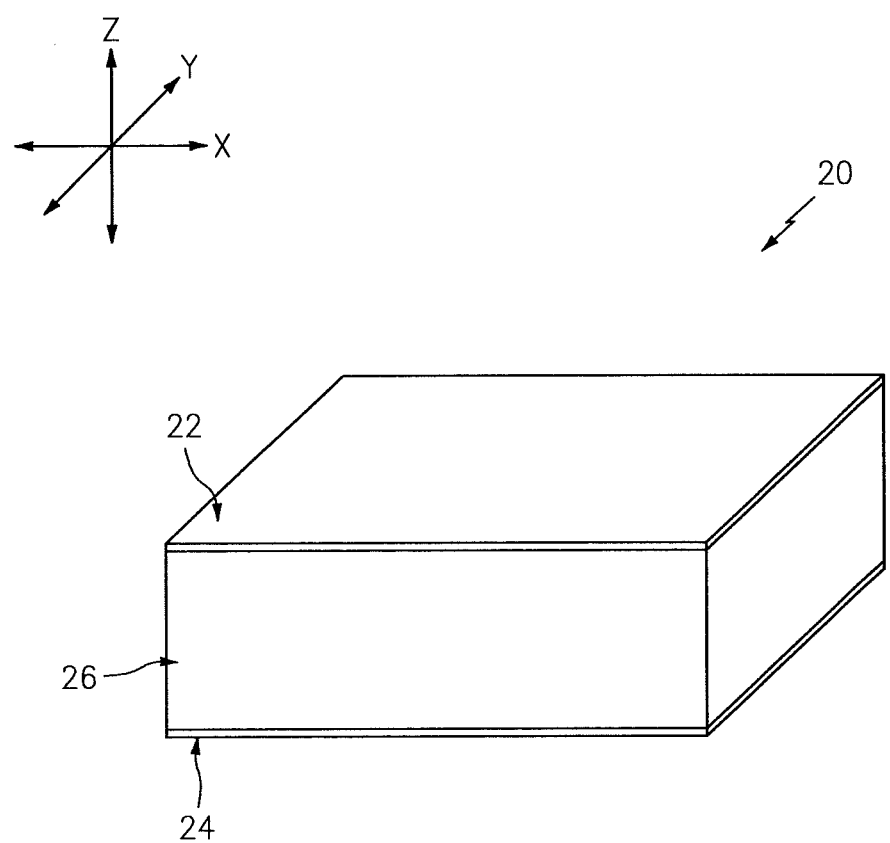
FIG. 1 is a partial, perspective block diagram illustration of an acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends longitudinally along an x-axis. The acoustic panel 20 extends laterally along a y-axis. The acoustic panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, or tapered with or without radial undulations. In such embodiments, a solely vertical direction (e.g., z-axis) direction is defined relative to a position of interest on the x-y plane. For example, on a spherical x-y plane, the vertical direction (e.g., z-axis) direction is a radial direction.

The acoustic panel 20 includes a perforated first (e.g., face) skin 22, a solid, non-perforated second (e.g., back) skin 24 and a structural, cellular core 26. Briefly, the cellular core 26 is disposed and extends vertically between the first skin 22 and the second skin 24. The cellular core 26 is also connected to the first skin 22 and the second skin 24. The cellular core 26, for example, may be welded, brazed, fused, adhered or otherwise bonded to the first skin 22 and/or the second skin 24. The cellular core 26 may also or alternatively be mechanically fastened to the first skin 22 and/or the second skin 24. Alternatively, the cellular core 26 may be formed integral with the first skin 22 and/or the second skin 24 as a monolithic body using, for example, additive manufacturing. An exemplary, non-limiting embodiment of manufacturing an embodiment of the acoustic panel 20 is discussed below in further detail. However, as indicated above, the present disclosure is not limited to any particular manufacturing methods.

Figure 2:
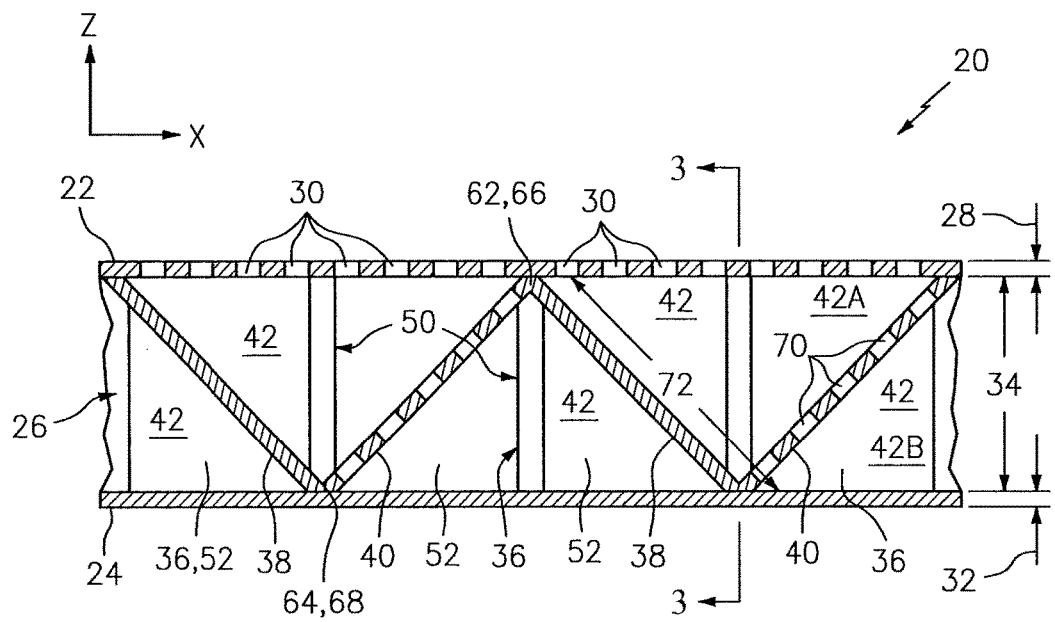
FIG. 2 is a sectional illustration of a portion of the acoustic panel taken in an x-z plane.

The first skin 22 may be configured as a relatively thin sheet or layer of material that extends laterally and longitudinally along the x-y plane. This first skin material may include, but is not limited to, a metal, a polymer, a fiber reinforced matrix (e.g., fiberglass composite, carbon fiber composite, aramid fiber composite, etc.), or a combination thereof. Referring now to FIG. 2, the first skin 22 has a vertical thickness 28, which extends vertically between opposing side surfaces. The first skin 22 includes a plurality of perforations 30; e.g., apertures such as through-holes. Each of these perforations 30 extends generally vertically through the first skin 22 between its side surfaces.

The second skin 24 may be configured as a relatively thin sheet or layer of (e.g., continuous and uninterrupted) material that extends laterally and longitudinally along the x-y plane (see FIG. 1). This second skin material may include, but is not limited to, a metal, a polymer, a fiber reinforced composite (e.g., fiberglass composite, carbon fiber composite, aramid fiber composite, etc.), or a combination thereof. The second skin material may be the same as or different than the first skin material. The second skin 24 has a vertical thickness 32, which extends vertically between opposing side surfaces. This vertical thickness 32 may be substantially equal to or different (e.g., greater or less) than the vertical thickness 28 of the first skin 22.

The cellular core 26 extends laterally and longitudinally along the x-y plane (see FIG. 1). The cellular core 26 has a vertical thickness 34, which extends vertically between opposing core sides, which are abutted against the skins 22 and 24. This vertical thickness 34 may be substantially greater than the vertical thickness 28, 32 of first skin 22 and/or the second skin 24. The vertical thickness 34, for example, may be at least ten to forty times (10-40×), or more, greater than the vertical thickness 28, 32; however, the acoustic panel 20 of the present disclosure is not limited to such an exemplary embodiment.

Referring to FIGS. 2-5, the cellular core 26 includes a plurality of walls 36, a plurality of baffles 38 and a plurality of septums 40. These components 36, 38 and 40 are arranged together to configure the cellular core 26 as an open cavity (e.g., open cell) structure. This open cavity structure forms a plurality of cavities 42 vertically between the first skin 22 and the second skin 24. These cavities 42 may be arranged in a plurality of linear arrays 44 (see FIG. 4), where each array 44 extends longitudinally along the x-axis. Each of the cavities 42 may be fluidly coupled with one or more respective perforations 30 in the first skin 22 (see FIGS. 2 and 3).

The walls 36 may be arranged generally parallel with one another. The walls 36 are laterally spaced from one another so as to respectively form the cavities 42 laterally between the walls 36. Each of the walls 36 thereby respectively forms lateral peripheral sides of the cavities 42 in at least one of the arrays 44. Each intermediate wall 36 (e.g., a wall laterally disposed between two other walls), more particularly, forms the lateral peripheral sides of the cavities 42 in a respective adjacent pair of the arrays 44. Each intermediate wall 36 is also disposed laterally between the respective adjacent pair of the arrays 44 and thereby fluidly separates the cavities 42 in those arrays 44 from one another.

Figure 3:
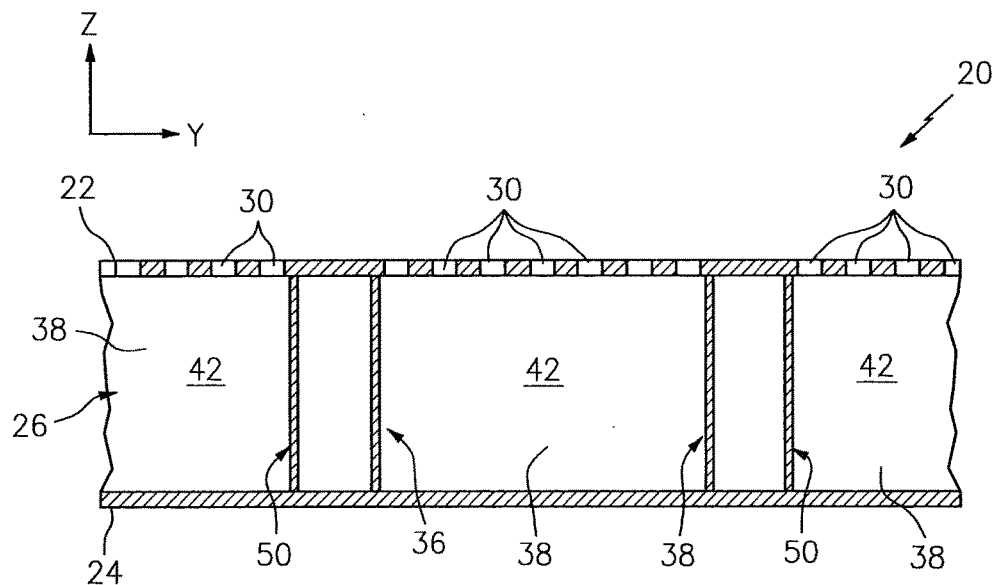
FIG. 3 is another sectional illustration of the acoustic panel portion of FIG. 2 taken in a y-z plane.

Each of the walls 36 extends vertically between the first skin 22 and the second skin 24 (see FIGS. 2 and 3). Each of the walls 36 may also be connected (e.g., bonded and/or otherwise) to the first skin 22 and/or the second skin 24. Each of the walls 36 is orientated substantially perpendicular to the first skin 22 and the second skin 24. However, in other embodiments, one or more of the walls 36 may be offset from the first skin 22 and/or the second skin 24 by a non-ninety degree angle; e.g., an acute included angle.

Figure 4:
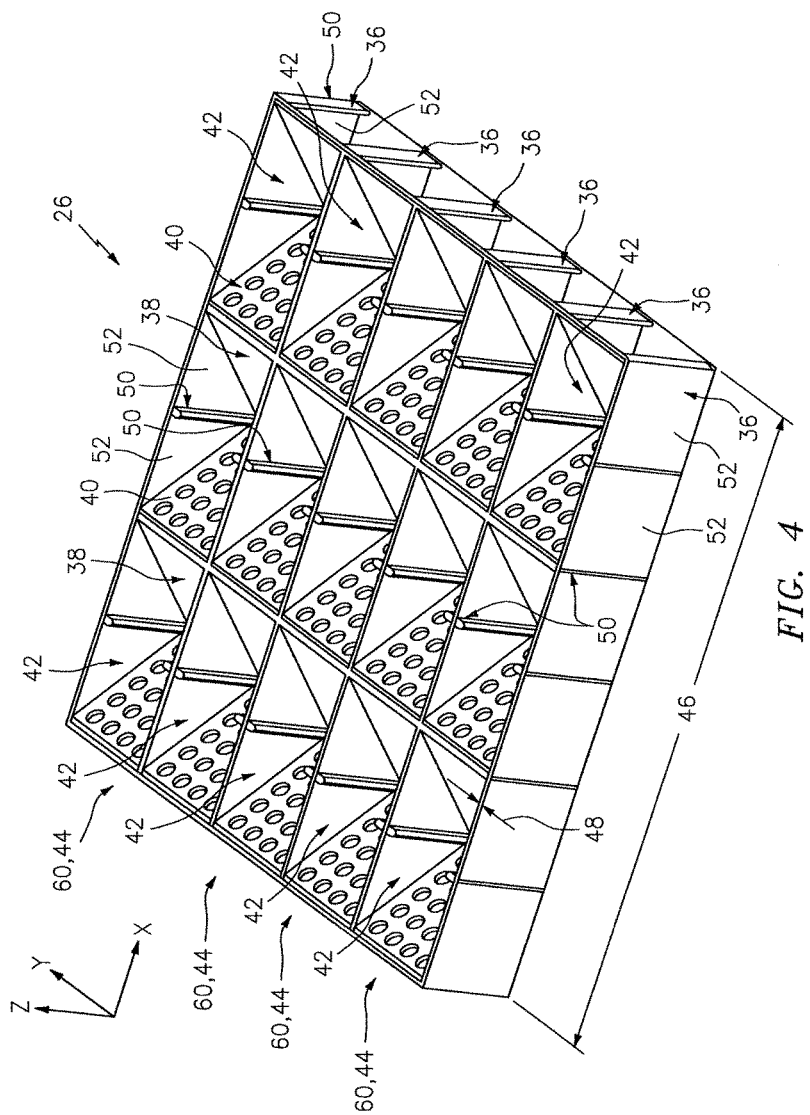
FIG. 4 is a perspective illustration of a portion of a cellular core for the acoustic panel.

Referring to FIG. 4, each of the walls 36 has a length 46 that extends longitudinally along the x-axis. Each of the walls 36 has a thickness 48 that extends laterally along the y-axis, where the length 46 is substantially (e.g., at least 20 times) larger than the thickness 48. The present disclosure, however, is not limited to the foregoing size relationship between the length 46 and thickness 48 of the walls 36.

The thickness 48 of each of the walls 36 changes as that wall 36 extends longitudinally within the acoustic panel 20. Each of the walls 36 of FIG. 4, for example, includes a plurality of vertical stiffeners 50 interdisposed (e.g., alternated) with a plurality of webs 52. Each of the stiffeners 50 may be, for example, 1.5 to 10 times thicker than the webs 52. The present disclosure, however, is not limited to the foregoing exemplary size relationship between the thickness of the vertical stiffeners 50 and the webs 52.

Each of the vertical stiffeners 50 may be configured as a structural flange portion, which is operable to increase the structural rigidity and strength of the wall 36. The vertical stiffeners 50, for example, may increase vertical strength and, thus, resistance to buckling due to increased lateral stiffness. The vertical stiffeners 50 may also increase lateral strength by increasing resistance to lateral bending.

Each of the vertical stiffeners 50 of FIG. 4 may be configured similar to a flange portion of a structural I-beam. More particularly, each of the vertical stiffeners 50 of FIG. 4 projects laterally out from an adjacent pair of the webs 52 in a first lateral direction and partially into a respective one of the cavities 42 to a distal end of that stiffener 50. Each of the vertical stiffeners 50 also projects laterally out from the adjacent pair of the webs 52 in a second (opposite) lateral direction and partially into another respective one of the cavities 42 to an opposing distal end of that stiffener 50. However, in other embodiments, one or more of the vertical stiffeners 50 may only project laterally in one of the directions.

FIGS. 6 and 7 illustrate an exemplary one of the vertical stiffeners 50. This vertical stiffener 50 extends vertically between the first skin 22 and the second skin 24. The vertical stiffener 50 may also be connected (e.g., bonded and/or otherwise) to the first skin 22 and/or the second skin 24. Of course, in other embodiments, the vertical stiffener 50 may only engage and/or be connected to one of the skins 22, 24. In still other embodiments, the vertical stiffener 50 may extend partially vertically within the wall 36 and not engage or be connected to either of the skins 22, 24. While the stiffener 50 is shown in FIGS. 6 and 7 as being perpendicular to the skins 22 and 24, one or more of the stiffeners 50 may alternatively be configured acutely or obtusely angled to the skins 22 and/or 24.

Referring again to FIGS. 6 and 7, the vertical stiffener 50 may be at least partially or completely vertically hollow. The vertical stiffener 50 of FIGS. 6 and 7, for example, includes a bore 54 which extends vertically through that stiffener 50 to the skins 22 and 24. However, in other embodiments, the bore 54 may extend vertically within or into (not through) the vertical stiffener 50. The vertical stiffener 50 of FIGS. 6 and 7 has a laterally elongated, generally rectangular cross-sectional (x-y plane) geometry; best seen in FIG. 5. The bore 54 has a corresponding laterally elongated, generally linear cross-sectional (x-y plane) geometry.

Figure 8:
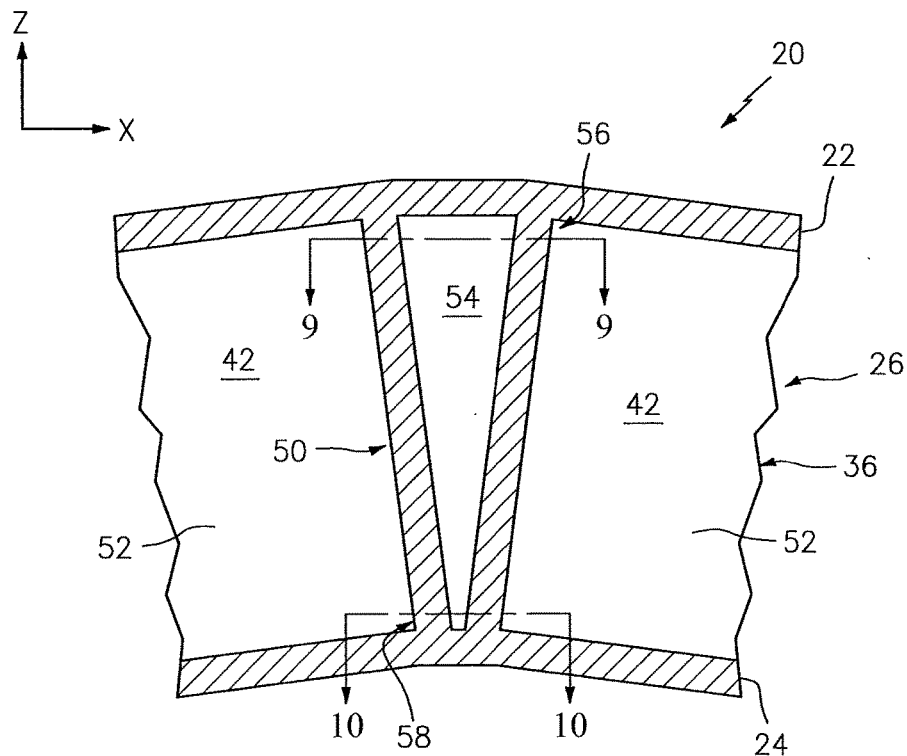
FIG. 8 is a sectional illustration of a portion of the acoustic panel bending in the x-z plane.
Figure 9:
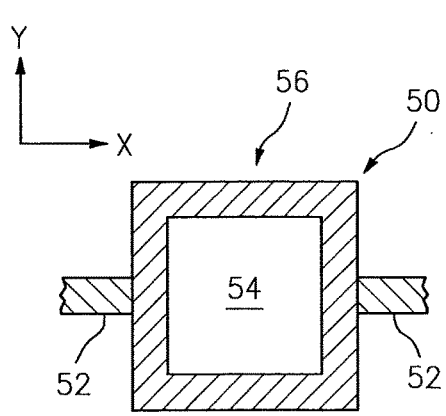
FIG. 9 is a cross-sectional illustration of a top portion of a vertical stiffener included in the acoustic panel of FIG. 8.
Figure 10:
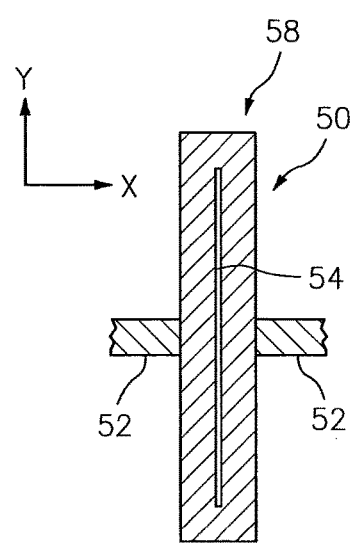
FIG. 10 is a cross-sectional illustration of a bottom portion of the vertical stiffener included in the acoustic panel of FIG. 8.

With the foregoing configuration, the vertical stiffener 50 is configured to enable vertical bending of the wall 36. The term "vertical bending" may describe bending of a wall along its longitudinal length in, for example, the x-z plane. For example, as illustrated in FIGS. 8 and 9, a top portion 56 of the vertical stiffener 50 may deform (e.g., into a square shape; see FIG. 9) allowing the adjacent webs 52 to move longitudinally away from one another. In addition or alternatively, as illustrated in FIGS. 8 and 10, a bottom portion 58 of the vertical stiffener 50 may deform (e.g., pinch together; see FIG. 10) allowing the adjacent webs 52 to move longitudinally towards one another. Thus, the vertical stiffener 50 may operate as a hinge or an accordion bellow. In this manner, the acoustic panel 20 may be formed with a generally curved sectional geometry as shown in FIG. 8. Note, the terms "top" and "bottom" are used above to describe portions of the stiffener as situated in the drawings and are not intended to limit the vertical stiffener 50 or the acoustic panel 20 to such an exemplary gravitational orientation.

Each vertical stiffener 50 is also operable to increase the surface area of the cellular core 26 that is next to and vertically engages the first skin 22 and the second skin 24. By increasing the surface area (compared to a wall without a stiffener or stiffeners), more area is available for connecting (e.g., bonding and/or otherwise) the cellular core 26 to the first skin 22 and the second skin 24. In this manner, the acoustic panel 20 can withstand higher shear forces than an acoustic panel of the same kind configured without such vertical stiffeners.

Referring again to FIG. 4, the vertical stiffeners 50 are interdisposed with the webs 52 of a corresponding wall 36. More particularly, each of the vertical stiffeners 50 (unless configured at a longitudinal end of the wall 36) is disposed longitudinally between and connected to a respective adjacent pair of the webs 52. Thus, adjacent stiffeners 50 are separated by a longitudinal distance. Similarly, each of the webs 52 (unless configured at a longitudinal end of the wall 36) extends longitudinally between and is connected to a respective adjacent pair of the vertical stiffeners 50.

The baffles 38 and the septums 40 are grouped together into a plurality of linear, longitudinally extending arrays 60. Each of these arrays 60 includes a subset (e.g., linear array) of the baffles 38 and a subset (e.g., linear array) of the septums 40. The baffles 38 in each array 60 are interdisposed with the septums 40 in that array 60. More particularly, each of the baffles 38 (unless configured at a longitudinal end of the wall 36) is disposed and may extend longitudinally between a respective adjacent pair of the septums 40. Similarly, each of the septums 40 (unless configured at a longitudinal end of the wall 36) is disposed and may extend longitudinally between a respective adjacent pair of the baffles 38.

Referring to FIG. 2, one end 62 of each of the baffles 38 is disposed towards, vertically engaged with and/or connected to the first skin 22. An opposing end 64 of each of the baffles 38 is disposed towards, vertically engaged with and/or connected to the second skin 24. Thus, each of the baffles 38 may be angularly offset from the first skin 22 and the second skin 24 by an angle; e.g., an acute angle or other (e.g., ninety degree) angle. Similarly, one end 66 of each of the septums 40 is disposed towards, vertically engaged with and/or connected to the first skin 22. An opposing end 68 of each of the septums 40 is disposed towards, vertically engaged with and/or connected to the second skin 24. Thus, each of the septums 40 may be angularly offset from the first skin 22 and the second skin 24 by an angle; e.g., an acute angle or other (e.g., ninety degree) angle. In this manner, each array 60 (see FIG. 4) of baffles 38 and septums 40 of FIG. 4 has a corrugated configuration, where one of the baffles 38 and one of the septums 40 may form a single corrugation. Of course, in other embodiments, one or more of the corrugations may each include an additional element (e.g., a bridge) and/or a slight gap.

Each of the cavities 42 extends longitudinally between and is formed by an adjacent pair of the baffles 38. Each septum 40 is disposed within and divides a respective one of the cavities 42 into fluidly coupled sub-cavities 42A and 42B. More particularly, one or more perforations 70 in the septum 40 fluidly coupled the sub-cavities 42A and 42B together.

With the foregoing core 26 configuration, each of the cavities 42 forms a resonance chamber. A length 72 of the resonance chamber extends diagonally between the first skin 22 and the second skin 24 and through a respective one of the septums 40. The length 72 of the resonance chamber therefore is longer than the vertical thickness 34 of the cellular core 26. This enables noise attenuation of relatively low frequency noise without increasing the vertical thickness 34 of the acoustic panel 20. For example, each resonance chamber may receive noise waves through the perforations 30 in the first skin 22. The resonance chamber may reverse the phase of one or more frequencies of those sound waves using known acoustic reflection principles and subsequently direct the reverse phase sound waves out of the acoustic panel 20 through the perforations 30 to destructively interfere with other incoming noise waves.

The cellular core 26 may be constructed from any suitable material(s). The cellular core 26, for example, may be constructed from a metal, a polymer, a fiber reinforced composite (e.g., fiberglass composite, carbon fiber composite, aramid fiber composite, etc.), or a combination thereof. One or more of components of the cellular core 26 may be constructed from the same or a like material. Alternatively, one or more of the components of the cellular core 26 may be constructed from a different material than one or more of the other components of the cellular core 26.

Figure 11:
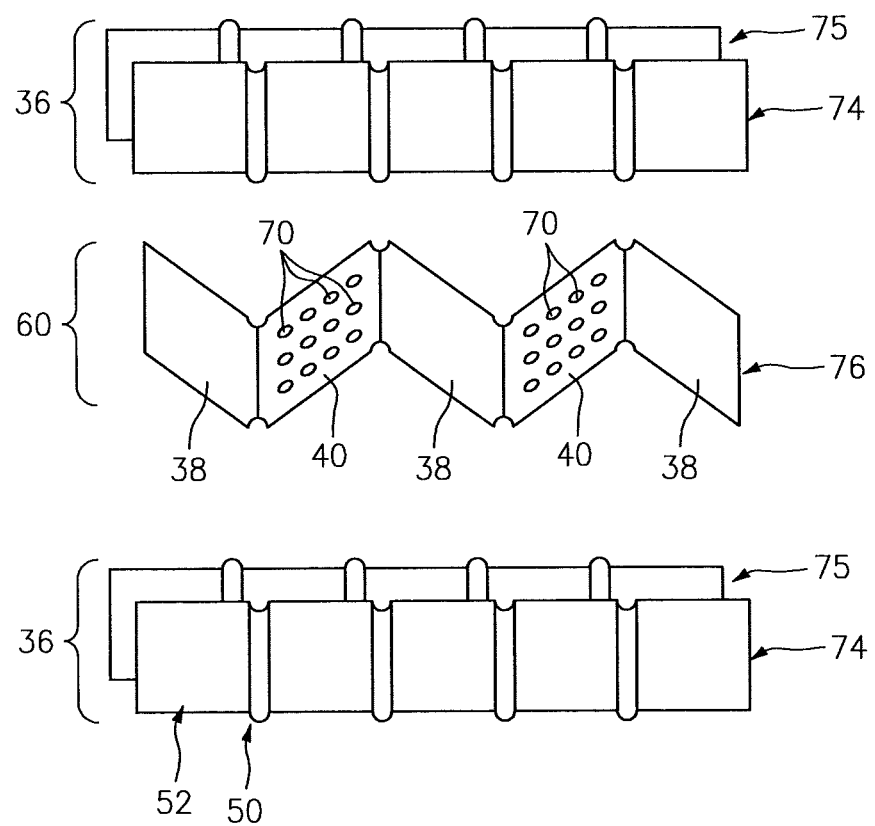
FIG. 11 is an exploded, perspective illustration of a cellular core for an acoustic panel before being assembled.

In some embodiments, referring to FIG. 11, the cellular core 26 may be constructed from a plurality of strips 74-76 of bent and worked material; e.g., metal. Each of the walls 36, for example, may be constructed from two strips 74 and 75 of material connected together. The vertical stiffeners 50 may be formed by kinking or otherwise bending and deforming select portions of each of the strips 74 and 75. Each array 60 of the baffles 38 and the septums 40 may be constructed by forming the perforations 70 in select portions of a strip 76 of material. That perforated strip 76 of material may then be bent or otherwise deformed to provide the strip 76 with a corrugated configuration. The formed strips 74-76 of material may then be assembled together to form the cellular core 26.

Figure 5:
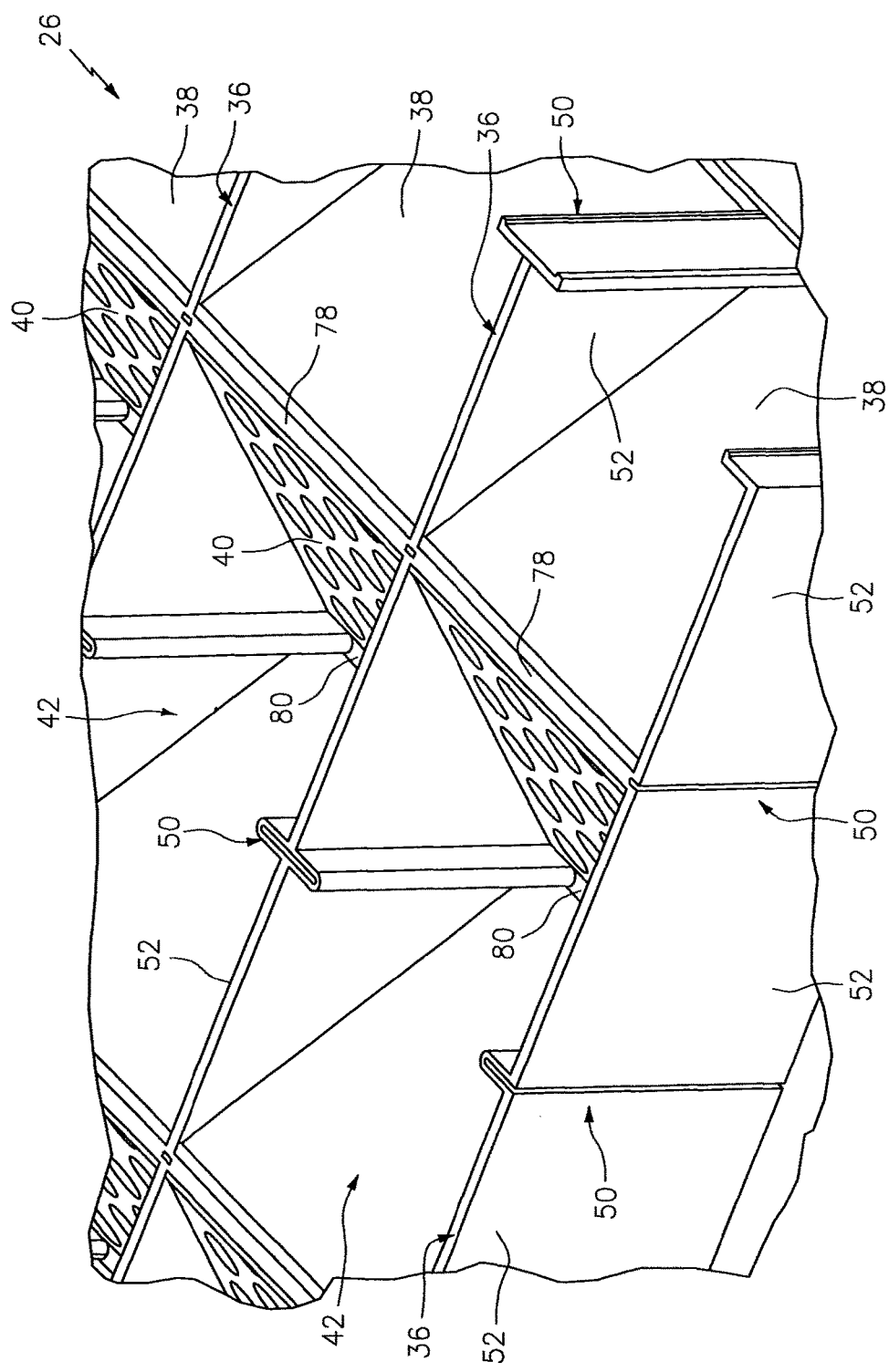
FIG. 5 is a perspective illustration of an enlarged portion of the cellular core of FIG. 4.
Figure 16:
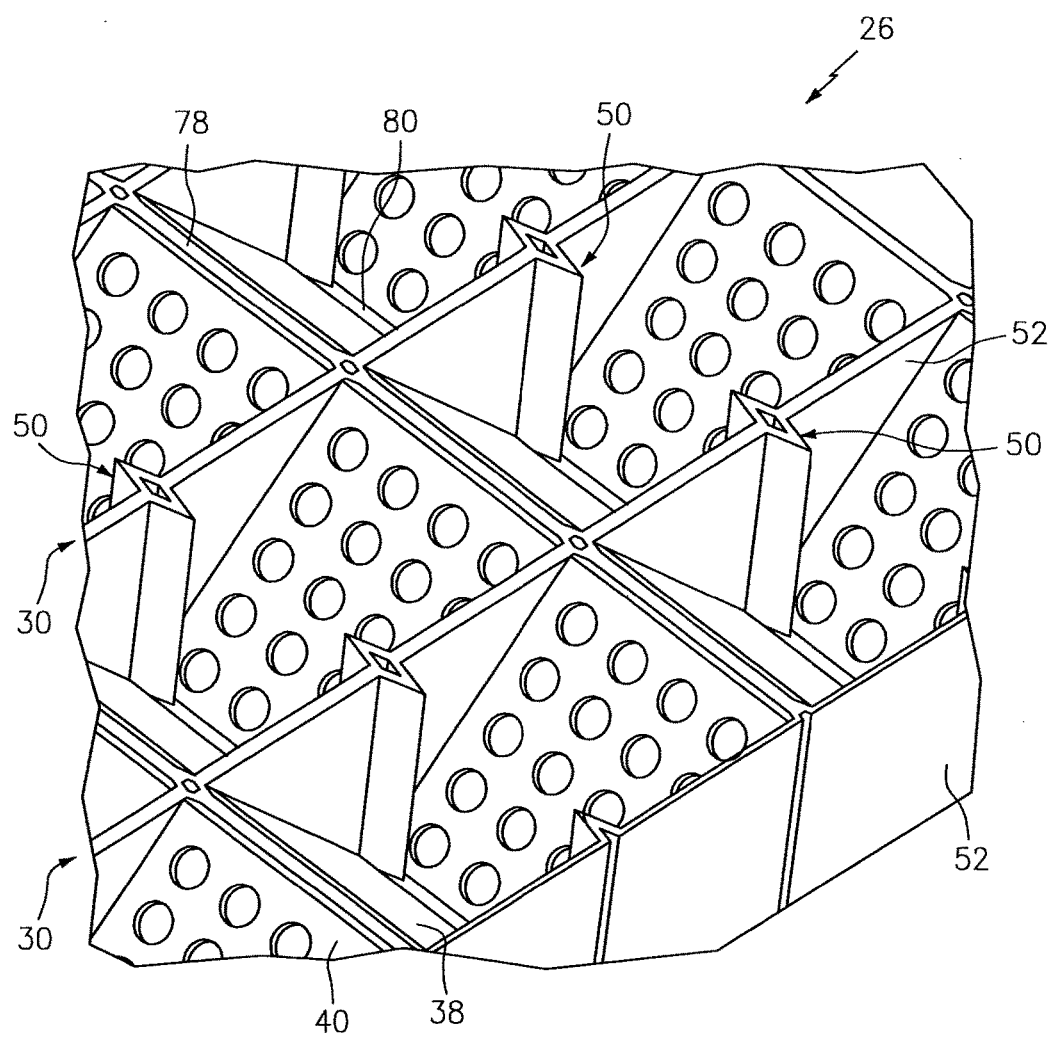
FIG. 16 is a partial, perspective illustration of still another cellular core for the acoustic panel.
Figure 17:
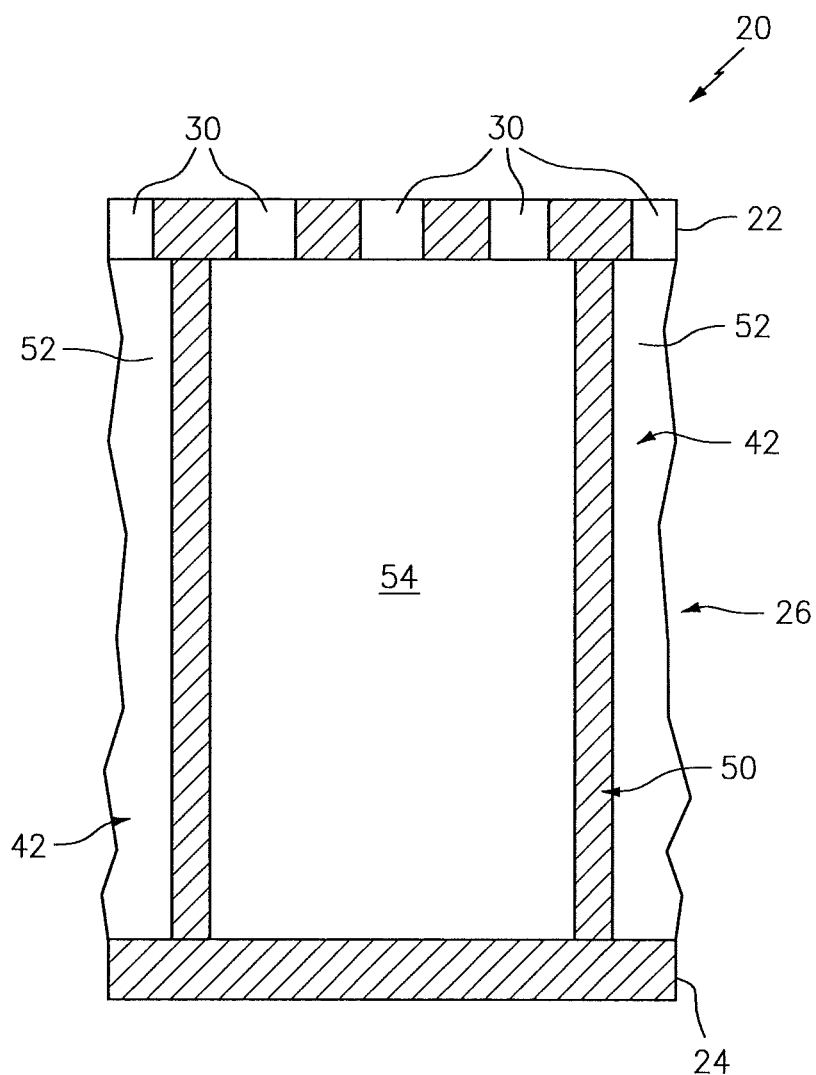
FIG. 17 is a partial, sectional illustration of another acoustic panel.

The core 26 of the present disclosure may have various alternative configurations than those described above. For example, one or more of the septums 40 may be configured generally perpendicular to the first skin 22 and/or the second skin 24. One or more of the vertical stiffeners 50 may each have a vertically uniform configuration as shown in FIG. 5; see also FIGS. 12, 13 and 16. One or more of the vertical stiffeners 50 may each have a vertically non-uniform (e.g., tapering) configuration as illustrated in FIGS. 14 and 15. The vertical stiffeners 50 may be respectively disposed longitudinally at (e.g., on, adjacent or proximate) intersections 78 and/or 80 between the baffles 38 and the septums 40 as shown in FIG. 5; see also FIGS. 12-16. Alternatively, one or more of the stiffeners 50 may be respectively disposed longitudinally between the intersections 78 and 80 of the baffles 38 and the septums 40. One or more of the vertical stiffeners 50 may each have a hexagonal cross-sectional geometry (see FIGS. 12 and 13), a square cross-sectional geometry (see FIGS. 14 and 15), a diamond cross-sectional geometry (see FIG. 16), or any other type of polygonal and/or curved cross-sectional geometry. In some embodiments, the bores 54 of one or more of the vertical stiffeners 50 may be fluidly coupled with one or more respective perforations 30 in the first skin 22 as shown in FIG. 17. In this manner, those bores 54 may be configured as higher frequency noise attenuation chambers. The present disclosure therefore is not limited to the specific cellular core configurations described above and illustrated in the drawings.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A structural panel, comprising:
   a first skin;
   a second skin; and
   a core forming a plurality of cavities vertically between the first skin and the second skin, the core including a wall connected to and extending vertically between the first skin and the second skin, the wall laterally between and fluidly separating at least a first of the cavities from a second of the cavities;
   wherein the wall includes a vertical stiffener;
   wherein one or more perforations in the first skin are fluidly coupled with the first of the cavities; and
   wherein the first of the cavities forms a resonance chamber having a minimum length that extends between the first skin and the second skin, and the minimum length is longer than a vertical thickness of the core.

2. The panel of claim 1, wherein the vertical stiffener is one of a plurality of vertical stiffeners included with the wall, and one of the vertical stiffeners is disposed a longitudinal distance along the wall from an adjacent one of the vertical stiffeners.

3. The panel of claim 1, wherein the vertical stiffener projects laterally partially into the first of the cavities.

4. The panel of claim 3, wherein the vertical stiffener projects laterally partially into the second of the cavities.

5. The panel of claim 1, wherein the vertical stiffener is hollow and includes a bore extending at least vertically within the vertical stiffener.

6. The panel of claim 5, wherein one or more perforations in the first skin are fluidly coupled with the bore.

7. The panel of claim 1, wherein the vertical stiffener extends vertically to the first skin and/or the second skin.

8. The panel of claim 1, wherein the vertical stiffener is connected to the first skin and/or the second skin.

9. The panel of claim 1, wherein the vertical stiffener is configured to enable vertical bending of the wall.

10. The panel of claim 1, wherein the vertical stiffener is configured as an accordion bellow.

11. The panel of claim 1, wherein
   the wall is a first wall and the vertical stiffener is a first vertical stiffener;
   the core includes a second wall connected to and extending vertically between the first skin and the second skin;
   the second wall is laterally between and fluidly separates at least the first of the cavities from a third of the cavities; and
   the second wall includes a second vertical stiffener.

12. The panel of claim 11, wherein
   the core includes a plurality of baffles and a plurality of septums;
   the baffles are arranged in a longitudinal linear array, each of the baffles is connected to and extends laterally between the first wall and the second wall, and the first of the cavities extends longitudinally between an adjacent pair of the baffles; and
   the septums are arranged in a longitudinal linear array, each of the septums is connected to and extends laterally between the first wall and the second wall, a first of the septums is disposed between the adjacent pair of the baffles and divides the first of the cavities into fluidly coupled first and second sub-cavities.

13. The panel of claim 12, wherein the first of the septums is connected to and extends between the adjacent pair of the baffles.

14. The panel of claim 12, wherein the baffles are arranged with the septums together in a corrugated configuration.

15. The panel of claim 12, wherein the vertical stiffener is at an intersection between the first of the septums and one of the adjacent pair of the baffles.

16. The panel of claim 12, wherein
   the vertical stiffener is a first vertical stiffener and the wall further includes a second vertical stiffener; and
   the first vertical stiffener is at an intersection between the first of the septums and a first of the adjacent pair of the baffles, and the second vertical stiffener is at an intersection between the first of the septums and a second of the adjacent pair of the baffles.

17. The panel of claim 1, wherein
   the vertical stiffener is one of a plurality of vertical stiffeners included with the wall;
   each of the vertical stiffeners is configured as a structural flange portion; and
   the wall further includes a plurality of webs, where each of the webs extends longitudinally between an adjacent pair of the vertical stiffeners.

18. The panel of claim 1, wherein the panel is configured as a component of an aircraft propulsion system.

19. A structural panel for attenuating noise, comprising:
   a first skin;
   a second skin; and
   a core forming a plurality of cavities vertically between the first skin and the second skin, the core including a plurality of walls connected to and extending vertically between the first skin and the second skin, a first of the walls laterally between and fluidly separating at least a first of the cavities from a second of the cavities, and a second of the walls laterally between and fluidly separating at least the first of the cavities from a third of the cavities;
   wherein each of the walls includes a substantially flat and planar first portion, a substantially flat and planar second portion and a vertical stiffener longitudinally between the first portion and the second portion, and the vertical stiffener of the first of the walls projects partially laterally into the first of the cavities and out from the first portion and the second portion; and
   wherein one or more perforations in the first skin are fluidly coupled with the first of the cavities.

20. A structural panel for attenuating noise, comprising:
   a first skin;
   a second skin; and
   a core forming a plurality of cavities vertically between the first skin and the second skin, the core including a plurality of walls, an array of baffles and an array of septums, a first of the walls laterally between and fluidly separating at least a first of the cavities from a second of the cavities, and a second of the walls laterally between and fluidly separating at least the first of the cavities from a third of the cavities;
   wherein the baffles are interdisposed with the septums in a corrugated configuration, the first of the cavities extends between an adjacent pair of the baffles, and a first of the septums is disposed between the adjacent pair of the baffles and divides the first of the cavities into fluidly coupled first and second sub-cavities;

wherein the first of the walls includes a plurality of vertical stiffeners distributed along a longitudinal length of the first of the walls;

wherein one or more perforations in the first skin are fluidly coupled with the first of the cavities; and wherein a first of the adjacent pair of the baffles is acutely angled relative to the first skin and the second skin.

\* \* \* \* \*